United States Patent [19]

Heubl

[11] Patent Number: 5,046,750
[45] Date of Patent: Sep. 10, 1991

[54] ROLLING COASTER FOR SMALL CHILDREN

[76] Inventor: Ulrike Heubl, An der Pilzbuche 116, 7900 Ulm, Fed. Rep. of Germany

[21] Appl. No.: 585,035

[22] Filed: Sep. 19, 1990

Related U.S. Application Data

[63] Continuation of Ser. No. 327,960, filed as PCT DE 88/00429 on Jul. 7, 1988, published as WO 90/00126 on Jan. 12, abandoned.

[30] Foreign Application Priority Data

Jul. 7, 1987 [DE] Fed. Rep. of Germany ....... 3722442

[51] Int. Cl.$^5$ .............................................. B62M 29/00
[52] U.S. Cl. ........................... 280/87.021; 280/47.34; 272/70.3; 272/114
[58] Field of Search ................ 280/11.2, 11.21, 11.28, 280/18.1, 32.6, 23.1, 43.2, 47.34, 79.2, 87.01, 87.021, 87.03, 87.051; 272/70.3, 114, 144

[56] References Cited

U.S. PATENT DOCUMENTS

| | | | |
|---|---|---|---|
| 1,432,612 | 10/1922 | O'Connor | 280/87.051 |
| 1,572,273 | 2/1926 | Elton | 280/87.051 |
| 1,857,653 | 5/1932 | Meyercord et al. | 280/43.2 |
| 3,035,849 | 5/1962 | Groth | 280/87.01 |
| 3,044,797 | 7/1962 | Borland | 280/87.051 |
| 3,069,182 | 12/1962 | Hufford | 280/87.01 |
| 3,374,000 | 3/1968 | Wetzel | 280/87.021 X |
| 3,663,038 | 5/1972 | Hendricks | 280/87.01 X |
| 3,790,187 | 2/1974 | Radu et al. | 280/11.21 X |
| 3,992,023 | 11/1976 | Moorer | 272/70.3 X |
| 4,134,599 | 1/1979 | DiMille et al. | 280/87.01 |
| 4,194,752 | 3/1980 | Tilch et al. | 280/11.28 |
| 4,569,532 | 2/1986 | Mirkarimi | 280/87.051 |
| 4,894,034 | 1/1990 | Brown, III | 280/18.1 X |

FOREIGN PATENT DOCUMENTS

| | | |
|---|---|---|
| 2401343 | 7/1975 | Fed. Rep. of Germany . |
| 2740901 | 3/1979 | Fed. Rep. of Germany ........................ 280/87.051 |
| 963389 | 7/1964 | United Kingdom ............... 280/32.6 |
| 1575651 | 9/1980 | United Kingdom . |

Primary Examiner—David M. Mitchell
Assistant Examiner—Brian L. Johnson
Attorney, Agent, or Firm—Laurence R. Brown

[57] ABSTRACT

The invention relates to a rolling device (1) for small children and having a cover (2) shaped to correspond to the body form of the stomach of a small child lying thereon, which in the foreward region has a broad support surface (5) for the hands of the small child and in the rear region a small back appendage platform (6), which is joined through a gradually bordering and upwardly sloped support surface (7) to a breast region for the small child. The cover has wheels (3, 4) on the underside. A support for the small child in the vicinity of the breast region is provided by side ridges (9) adjacent the sloping support surface. Backward sliding of the small child is prevented by a raised platform (8) at the tail end of the rear support surface.

6 Claims, 4 Drawing Sheets

ROLLING COASTER FOR SMALL CHILDREN

This application is a continuation of application Ser. No. 07/327,960 filed as PCT DE 88/00429 on Jul. 7, 1988, published as WO 89/00126 on Jan. 12, 1989, and now abandoned.

BACKGROUND OF INVENTION

The invention relates to rolling coaster apparatus for small children.

One such rolling coaster is described in U.S. Pat. No. 1,572,273. This rolling device comprises a wheel mounted foreshortened cover shell on which the child's stomach rests. In order to prevent a child from rolling thereunder, ridges are formed on the sides. Furthermore, a child can be fastened by a belt positioned in the vicinity of the ridges. The cover tapers downwardly at its rear end in order to form a backwards extending continuation platform surface over whose sides the feet of the child pass alongside to rest on the ground. A similar continuation platform surface is provided on the front side of the cover which gradually tapers toward the front. A child can grip with the hands the sides of the forward continuation and reach with the hands down toward the ground. Through kicking motion with the legs and pushing motion of the arms the child can move the rolling coaster forward. This rolling coaster can be used by small children over six months old.

This rolling coaster nevertheless qualifies for the intended purpose of sitting on it. Thus, for example, the cover as a whole is caused to slope so that a small child in spite of the belt can slip out to the rear. If the belt is so tightly pulled on both sides in order to prevent the possibility of slipping out, then the child is held in place. Besides, freedom of the legs is noticeably restricted because of a sharp notch between the cover and a rearwardly positioned platform appendage. Furthermore there is the danger that the child by moving into an object in the vicinity of the hands could be injured. Thus it is intended to provide around the forward part of the front appendage, for example a horsehead, which has the function of a shock absorber; however placed not to disturb the sight of the child, and besides at least to remove shocks from the child to the horsehead.

One important point, a disadvantage of such roller coasters is the drawing in of the arms in the locomotion. With small children of an age of a few weeks coordinated movement of the arms and legs is not yet developed. Later the control of the head movements of the small children follows essentially through the support of the arms, so that however, with prior art roller carriages, significant movement of the back is possible as a risk taken when the small child has arms resting on the floor.

On the other hand, it is known that small children of the age of four weeks or earlier exhibit a distinct locomotion urge and already accomplish a kind of crawling locomotion, so that this invention has the object of providing rolling coasting equipment that improves the state of the art so that a small child at this age is able with the help of the roller coaster to investigate independently how to propel himself forward without instruction and without danger.

SUMMARY OF THE INVENTION

This object is realized in accordance with this invention by the features set forth in the claims.

Accordingly, the rolling coaster apparatus consists of a cover shaped to conform with the body shape of a small child lying on his stomach, which in its frontmost region approaches an oval shaped surface area upon which the hands rest, and which continues toward the rear narrowing into a rear extension. The transitional region gently slopes toward the rear and forms a supporting surface for the stomach and breast of a small child. The position of the supporting surface facilitates the support of the hands and the control of the movement of the head. The legs curve around the rearward appendage and reach down to the ground so that the small child moves himself forward by a kicking motion with the legs. Because of the streamlined transition between the support surface for the hands and the rear extension, the leg motion of the child is not disturbed.

Because of the aforedescribed shape of the cover shell of the rolling device the child's stomach lies thereon in a physiologically satisfactory position. The large support surface for the hands prevents damage to the child from striking an object. The front and side regions of the large support surface serve as a shock absorber. Besides, there can be provided, also in the vicinity of this support surface, a gripping ridge which the child can hold tightly. This gripping ridge is indented into the outer rim of the cover to prevent the danger of injury. The broad support surface for the hands also prevents the child from reaching over the side edges and for example being injured by extending the hands into the wheels. Furthermore in the transition region between the forward support surface for the hands and the rearward appendage a laterally disposed belt is fastened to prevent the small child from rolling sideways off the coaster device. This belt does not extend into the vicinity of the support surface for the hands so that it would prevent the small child from gripping the sides.

The rear end of the backwardly extending section can also be provided with an elevated surface, which when the small child slides off prevents movement to the rear, and on the other hand brings about a good exchange of propelling power to the coasting device from the movement of the legs.

Further details of the invention are set forth in the following description.

BRIEF DESCRIPTION OF THE DRAWING FIGURES

The invention is now explained by reference to the examples set forth in the drawing. The figures show:

FIG. 1—a perspective view of a coaster device in accordance with the invention with a superimposed small child lying on his stomach therein;

FIG. 2—a section through the length of the coaster apparatus;

FIG. 3—a top view of the coaster apparatus with a showing of the wheel positions;

FIG. 4—a schematic diagram showing an alternate embodiment of front wheels in the outer framework; and FIG. 5—a schematic showing a further embodiment of a shock mounted front wheel.

DETAILED DESCRIPTION OF THE DRAWINGS

Figure 1:
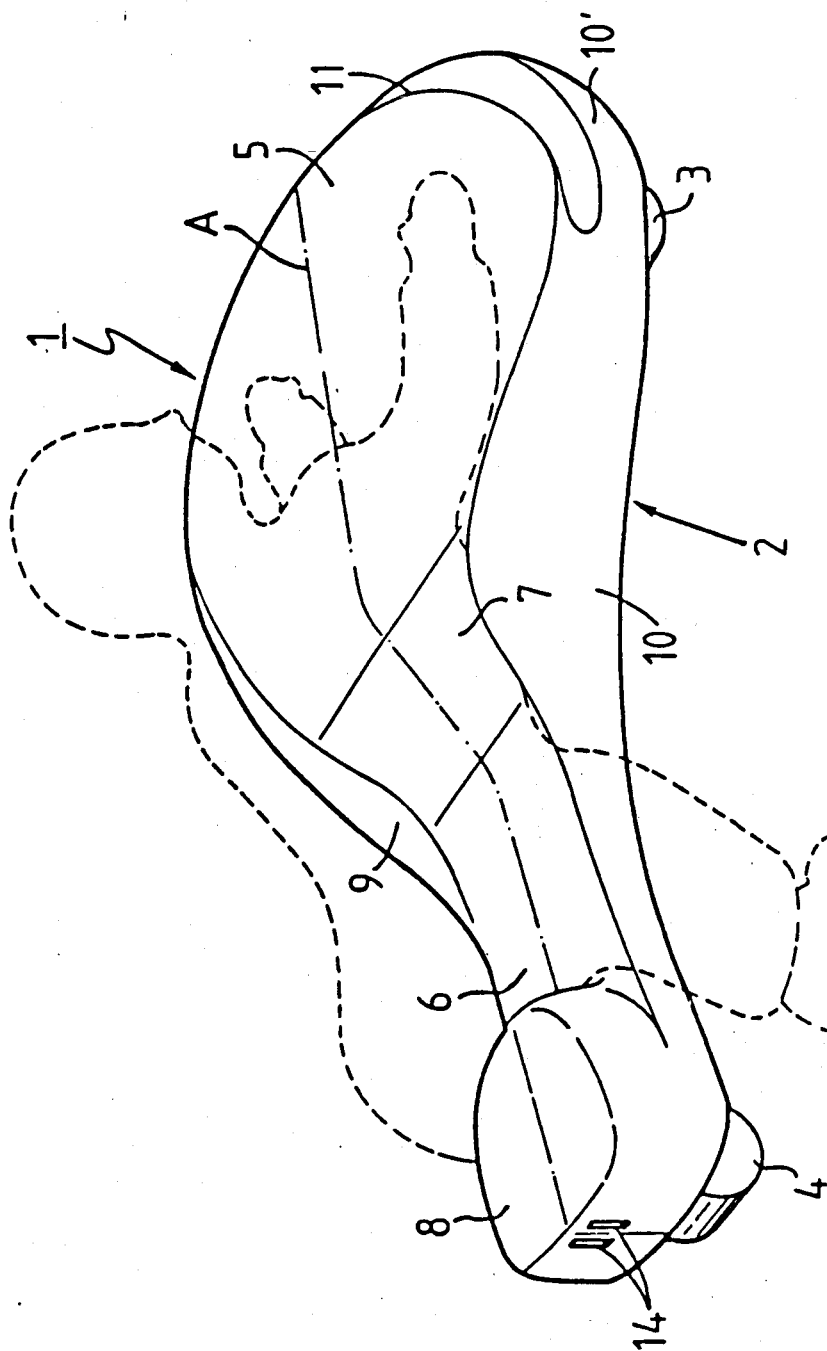
Figure 1:
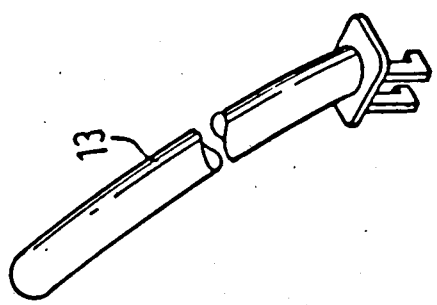

The coaster device (1) shown in FIG. 1 has a cover shell or frame (2) which is mounted in the front part on two forward wheels (3) and in the rear on one rear wheel (4). The cover shell (2), which for example is made of plastic, in the view of FIG. 2 has the form of a section through a somewhat pear shaped object which carries in the front region a somewhat horizontally running support surface (5) for the hands of small children, which has a contour somewhat like an oval. In this example the longer axis of the oval runs perpendicular to the longitudinal axis A of the coaster equipment. The rear end of the cover shell (2) contains a backwardly extending narrow bridging portion (6), whose upper surface runs somewhat horizontally. The upper surface of this bridge lies lower than that of the support surface (5). The support surface (5) and the rearwardly positioned bridging portion (6) are joined together by means of a gently sloping and gradually widening support surface (7), whose outer shape continuously merges into the oval shape of the weight bearing support surface (5). At the rear end of the backwardly extending bridging portion (6) is positioned a raised platform surface (8). The supporting surface (7) is confined at the outer sides by means of ridges (9), which extend at least over a portion of the region bordering the weight bearing support surface (5) and the backwardly extending bridging poriton (6) support surface.

As indicated in FIG. 1, the small child lies on the rolling coaster with the breast and stomach of the child positioned at the supporting surface (7), so that the child can reach his hands onto the supporting surface (5) without restriction, and can lift and move his head. The small child lies with his buttocks against the rear raised platform surface (8), so that his legs reach around the rearwardly extending bridging portion (6). Thus, the child with his feet on the floor can move the coaster device (1) forward by agitating his feet.

Figure 2:
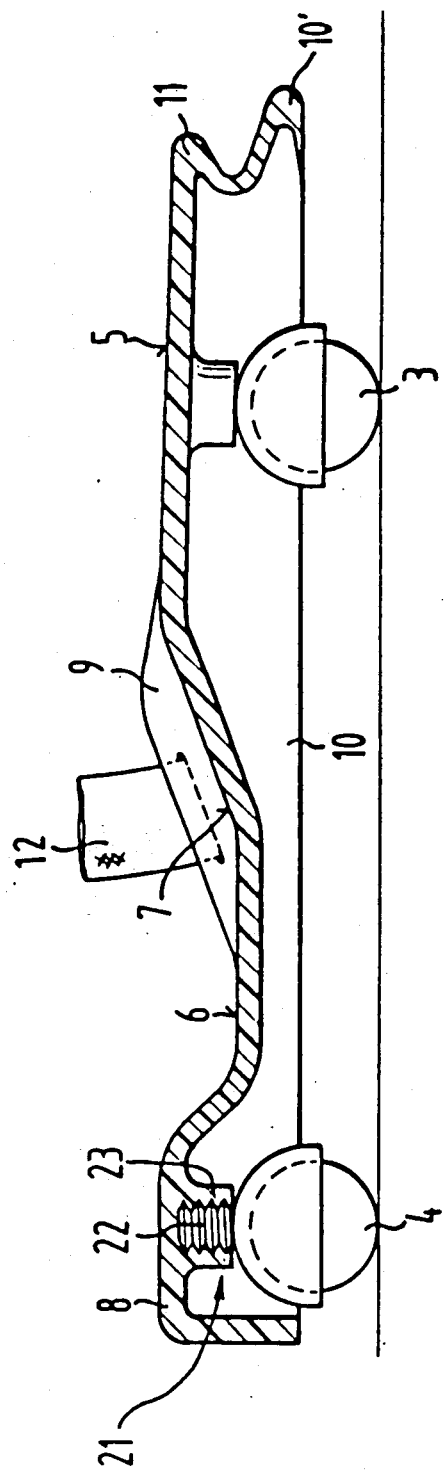
Figure 3:
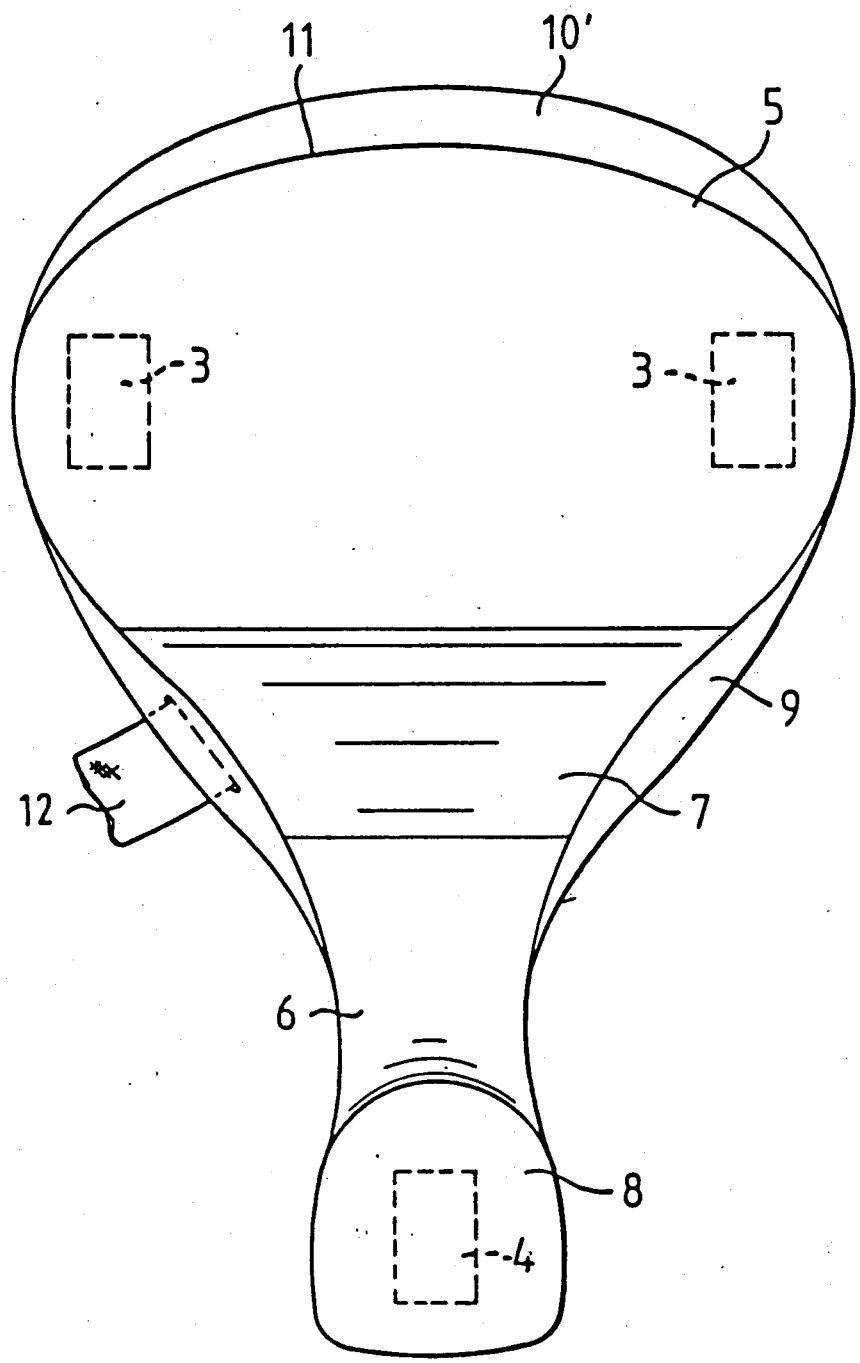

Also as set forth in FIG. 2, the underside of the cover shell (2) is concave, to produce side walls (10), which border the side portions of the support surface (5) and serve as shock absorbers (10'). In the border regions of the support surface (5), substantially parallel to the shock absorber (10'), also a gripping ridge (11) is provided and positioned so that when the small child grips this ridge his hands do not lie next to the shock absorber (10'). Thus injury by bumping into something is prevented.

Also as FIG. 1 illustrates, the small child lies on the roller coasting apparatus in a physiologically proper position and is secured against sliding off and rolling under. It is further possible to pass the belt (12) over the back of the child in the region of the ridges (9). Then on the belt (12) for example a larger belt can be fastened, which the parents hold, for example, when the roller carriage is not used in the house. To limit movement also the parents can hold the hand grip (13) as shown in FIG. 1, which for example is held by two prongs in the slits (14) on the rear ledge of the raised platform surface (8).

Figure 4:
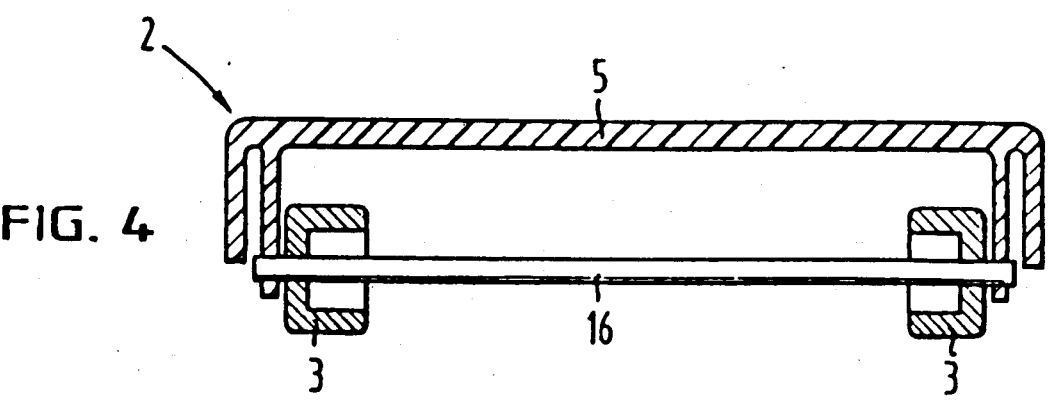

If the roller coaster apparatus is used by a small child older than a few weeks, then it is expedient that the front and rear wheels (3, 4) are not steerably mounted, so that the roller apparatus only can be moved ahead in a straight line with the front wheels then as shown schematically in FIG. 4.

From FIG. 4, it is evident that the front wheels for example may be bound together on a rigid axle. Also, a known brake can be provided to brake the front wheels.

In FIG. 2 a height changing mount (21) for the rear wheel (4) is shown. With this height position changing mount the position of the cover above the ground can be changed, in order to correct for the growth of the small child. The wheel mount in this example consists of an upwardly directed screw (22), which in the region of the raised platform surface (8) on the under side of the cover is firmly gripped in the screw threaded socket (23). A turning stop in a customary manner may be provided, for example by means of pins, not shown. Understandably other height adjusting devices are possible, such as for example, a swivelled lever arm. One such height adjusting mount can also be supplied for the front wheels (3). It may also be said that such a height adjusting mount on the outer parts of the cover is not unconditionally necessary.

When the small child grows a little older, for example, from three to six months, then the adjustable rolling apparatus can be changed in a known manner.

Figure 5:
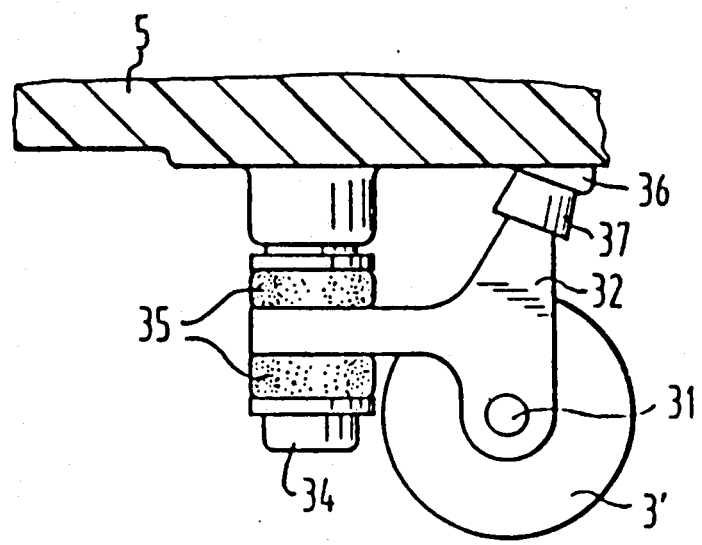

The rolling apparatus possibly is made flexible in response to an increase in weight, for example as is known in the so called skateboard for youth. One schematic example of flexible front wheels is shown in FIG. 5. Each front wheel of the aforesaid wheel pair (3) is mounted on an axle (31) with an L-shaped bracket (32). One arm of the L-shaped bracket (32) is rotatable about a bolt (34) which extends from the underside of the cover of the roller apparatus in the region of the support surface (5). On both sides of this arm, rubber cushions (35) are arranged on the bolt (34). The other arm of the L-shaped bracket extends into a peg for entering into a socket (36) on the under side of the support surface (5). Between the socket (36) and the arm is placed a rubber collar (37). The arm can swivel in the socket (36) in a manner damped by the rubber collar (37).

The described roller apparatus supports the natural craving of each small child to move away. The small child understandably is very quick to move forward froglike, or the like, as soon as he lies on the roller apparatus, and observes with interest the object offered him in a new environment.

By means of the front broadening of the cover it is possible to reach out the hands and to move the hands about the support surface. Accordingly, strengthening of the upper body and the resulting torso and head control is realized, which is necessary later for the small child to achieve. Also the course of development of movement by the small child is afforded physiologically by the use of the rolling apparatus, to thereby achieve skill and promote the complete body motor and mental development. Also for the therapy of a slower child and for growth prophylaxis the rolling apparatus is proven and effective.

I claim:

1. Rolling apparatus for small children comprising in combination,
   a riding platform having a continuous upper surface adapted to receive upon an upper weight bearing surface the stomach and hands of a small child face down thereupon, said riding platform having a shape with a narrow rear end with side portions permitting a child's feet to slide thereover and reach a planar surface upon which the platform is moved and an oval shaped front end presenting a support surface for supporting the child's breast and stomach substantially horizontally disposed with respect to the surface upon which the platform is moved and dimensioned to receive the hands of the child thereupon to support lifting and movement of the head and keep a child's hands off the support surface, an intermediate portion of said riding platform comprising a broadening crotch support surface extending between the narrow rear end and the oval shaped front end, said crotch support surface being disposed at a height from the planar surface less than that of both a terminal rear end raised platform and said oval shaped front end support surface, said raised platform including a rear end upwardly directed surface extending from the intermediate portion and serving as a rear stop for the buttocks of the child, and said intermediate portion sloping downwardly from the front end for supporting a child's stomach, and a set of three wheels attached beneath the supporting platform for movement thereof over the planar surface, said wheels located with one attached to the rear end and the other two attached respectively on opposite sides of the oval shaped front end.

2. The rolling apparatus as defined in claim 1 further comprising a rearward horizontal surface disposed at a height above the planar surface less than that of the oval support surface for supporting the feet in a crawling position.

3. The rolling apparatus as defined in claim 1 further comprising ridges extending upwardly from the intermediate portion sloping surface which supports the child's stomach.

4. The rolling apparatus of claim 3 further comprising a belt for retaining a child in place on the apparatus attached on opposite sides of the apparatus to said ridges.

5. The rolling apparatus of claim 1 further comprising means for attaching each of the two frontmost wheels in a fixed non-steerable position to said oval shaped support surface.

6. The rolling apparatus of claim 1 further comprising means for adjusting the height of the rolling apparatus support surfaces from said planar surface with height adjustment means on the two front wheels to adjust for growth of the child.

* * * * *